United States Patent
Rhu et al.

(10) Patent No.: US 10,556,816 B2
(45) Date of Patent: Feb. 11, 2020

(54) WASTEWATER TREATMENT APPARATUS

(71) Applicant: BKT CO., LTD., Daejeon (KR)

(72) Inventors: Dae-hwan Rhu, Gyeonggi-do (KR); Hong-keun Park, Seoul (KR); Min-ki Jung, Daejeon (KR)

(73) Assignee: BKT CO., LTD., Daejeon (KR)

( * ) Notice: Subject to any disclaimer, the term of this patent is extended or adjusted under 35 U.S.C. 154(b) by 0 days.

(21) Appl. No.: 15/760,351

(22) PCT Filed: Sep. 21, 2016

(86) PCT No.: PCT/KR2016/010494
§ 371 (c)(1),
(2) Date: Mar. 15, 2018

(87) PCT Pub. No.: WO2017/052167
PCT Pub. Date: Mar. 30, 2017

(65) Prior Publication Data
US 2018/0257966 A1  Sep. 13, 2018

(30) Foreign Application Priority Data

Sep. 23, 2015  (KR) .......................... 10-2015-0134425

(51) Int. Cl.
C02F 9/00 (2006.01)
C02F 3/20 (2006.01)
(Continued)

(52) U.S. Cl.
CPC .................. C02F 9/00 (2013.01); C02F 3/20 (2013.01); C02F 3/303 (2013.01); C02F 3/307 (2013.01);
(Continued)

(58) Field of Classification Search
None
See application file for complete search history.

(56) References Cited

U.S. PATENT DOCUMENTS

| | | | |
|---|---|---|---|
| 6,423,216 B1 | 7/2002 | Yum et al. | |
| 2011/0253625 A1 | 10/2011 | Takeda | |

FOREIGN PATENT DOCUMENTS

| | | |
|---|---|---|
| JP | 2005-324131 A | 11/2005 |
| JP | 2006272177 A | 10/2006 |

(Continued)

OTHER PUBLICATIONS

International Search Report dated Dec. 8, 2016, issued in counterpart International Application No. PCT/KR/2016/010494, with English translation. (5 pages).

(Continued)

*Primary Examiner* — Chester T Barry
(74) *Attorney, Agent, or Firm* — Juan Carlos A. Marquez; Marquez IP Law Office, PLLC

(57) ABSTRACT

A waste water treatment includes a biological filtration tank, a nitritation tank, and an anammox tank. The biological filtration tank performs biological filtration as a pretreatment process with regard to influent waste water and removes solids and organic matters. The nitritation tank performs a nitritation process with regard to waste water flowing from the biological filtration tank and supplies an electron acceptor needed for removing the organic matter in the biological filtration tank by returning some of the waste water back to the biological filtration tank. The anammox tank performs an anaerobic ammonium oxidizing process with regard to the waste water received from the biological filtration tank and the nitritation tank.

10 Claims, 8 Drawing Sheets

(51) Int. Cl.
   *C02F 3/30*     (2006.01)
   *C02F 3/32*     (2006.01)
   *C02F 101/16*   (2006.01)
   *C02F 101/30*   (2006.01)

(52) U.S. Cl.
   CPC .......... *C02F 3/322* (2013.01); *C02F 2101/16* (2013.01); *C02F 2101/30* (2013.01); *C02F 2301/046* (2013.01)

(56) References Cited

FOREIGN PATENT DOCUMENTS

| | | | |
|---|---|---|---|
| JP | 2014036959 | A | 2/2014 |
| KR | 1019990068372 | A | 9/1999 |
| KR | 10-2004-0056939 | A | 7/2004 |
| KR | 10-2005-0083097 | A | 8/2005 |
| KR | 1020050083097 | A | 8/2005 |
| KR | 10-1288495 | B1 | 7/2013 |
| KR | 10-2014-0020084 | A | 2/2014 |
| KR | 1020140020084 | A | 2/2014 |

OTHER PUBLICATIONS

Office Action mailed by Korean Intellectual Property Office dated Jan. 29, 2019, in corresponding Korean application 10-2017-0040113, 6 pages in Korean.

"Sewage facility standards," by Gyu-hong Park, Korean Water and Wastewaster Association, 2011, pp. 366, 377 & 393 in Korean.

WASTEWATER TREATMENT APPARATUS

CROSS-REFERENCE TO RELATED THE APPLICATION

This application claims priority from Korean Patent Application No. 10-2015-0134425 filed on Sep. 23, 2015 in the Korean Intellectual Property Office, the disclosure of which is incorporated herein by reference.

BACKGROUND

Field

The present disclosure relates to an appliance apparatus for processing waste water, and more particularly to a waste-water processing apparatus using a short-cut nitrogen removal process.

Description of the Related Art

Contaminants in sewage and waste water include not only solid and organic matters but also nutritive salts such as nitrogen and phosphorus. To remove such contaminants, physical, biological and chemical methods are used. Among them, the biological method of using bacteria to remove the contaminants has been mostly used since it is excellent in terms of economy/efficiency.

In a general method of biologically removing the contaminants, a reaction tank includes anaerobic/anoxic/aerobic tanks as shown in FIG. 1, and necessary bacteria are kept in each tank, thereby removing the contaminants through a biological mechanism of the bacteria. In general, the organic matters are removed in a biological treatment process by the following reaction. As shown in the formula, oxygen has to be supplied as an electron acceptor.

$$CH_3OH+O_2 \rightarrow CO_2+2H_2O$$

In the biological treatment process, oxygen needed for oxidizing the organic matters is supplied using oxygen in air by supplying air or using pure oxygen produced in a pure oxygen device by an air blower. Since 50% of power used in processing the sewage and waste water under the biological treatment process is consumed in operating an air blowing system, reduction of such power consumption is the most important thing in lowering operating costs.

To remove nitrogen from the sewage and waste water, many steps of biological reactions are needed. First, as shown in the following formula, air is applied to reduced ammoniac nitrogen to thereby oxidize nitrogen.

$$NH_4^+ + 1.5O_2 \rightarrow NO_2^- + 2H^+ + H_2O$$

$$NO_2^- + 0.5O_2 \rightarrow NO_3^-$$

$$NH_4^+ + 2O_2 \rightarrow NO_3^- + 2H_+ + H_2O$$

As shown in the foregoing formula, oxygen of 3.43 mg is required in oxidizing ammoniac nitrogen of 1 mg into nitrite nitrogen, and oxygen of 1.14 mg is additionally required in oxidizing nitrite nitrogen of 1 mg into nitric nitrogen. In result, oxygen of 4.7 mg is needed to oxidize ammoniac nitrogen of 1 mg into nitric nitrogen. Nitrogen in the sewage has a concentration of about 40~50 mg/L, and needs oxygen of 182.8~228.5 mg/L to be oxidized. Since this amount of oxygen is more than that needed for oxidizing the organic matter, it causes the operating costs of a sewage treatment plant to increase. Oxidized nitric nitrogen is subjected to a reaction based on the following formula and released as nitrogen gas into the atmosphere. Ultimately, nitrogen is removed.

$$NO_3^- + 1.08CH_3OH + 0.24H_2CO_3 \rightarrow 0.06C_5H_7O_2N + 0.47N_2 + 1.68H_2O + HCO_3^-$$

Thus, a lot of oxygen and organic matters are needed to biologically remove nitrogen, and this causes disposal costs to increase.

To solve such a problem, there has been developed a method of directly performing denitrification after oxidizing ammoniac nitrogen up to nitrite. This method reduces oxygen by 25% and the organic matter by 40% as compared with those of a conventional method.

Recently, new technologies have been developed to fundamentally solve such a problem. A nitritation and anaerobic ammonium oxidizing method refers to a short-cut nitrogen removal method of converting only 50% of ammoniac nitrogen into nitrite nitrogen and then using residual ammoniac nitrogen as an electron acceptor to perform denitrification. This method reduces oxygen by 62.5% and the organic matter by 100% as compared with those of a conventional method.

$$NH_4^+ + 1.5O_2 \rightarrow NO_2^- + 2H^+ + H_2O$$

$$NO_2^- + NH_4^+ N_2 + H_2O$$

Despite these advantages, the short-cut nitrogen removal process has been restrictively used in processing supernatant in an anaerobic digestion tank of the sewage treatment plant since its operating conditions are strict. However, recently, many researchers have steadily made attempts to introduce the short-cut nitrogen removal process as a main a main treatment process of the sewage treatment plant. To employ the short-cut nitrogen removal process as the main treatment process, there are problems to solve. As an important one among the problems, the solids and the organic matters in the sewage and waste water have to be removed before the short-cut nitrogen removal process.

To solve such a problem, many methods have been used. The most economical method is to remove the solids through condensation/precipitation. The condensation/precipitation can remove particles of the solids and the organic matters but not dissolved organic matters.

As another method, there is a high-load activated sludge process as shown in FIG. 2, in which the organic matters are removed by operating an aeration tank in state that the load of the organic matters is high. The high-load activated sludge process has an advantage of removing the dissolved organic matters but a disadvantage of requiring a large site since a stay time of 2~3 hours is needed in a secondary sedimentation basin. Further, the high-load activated sludge process has a problem of lowering an efficiency of the subsequent short-cut nitrogen removal process since sludge has bad precipitability.

SUMMARY

To solve the foregoing problems, biological filtration may be taken into account. The biological filtration refers to a process of performing both filtration and biological oxidization, which has advantages of not only removing solids and dissolved organic matters from sewage and waste water efficiently for a short stay time, but also requiring a small site since there are no needs of a secondary sedimentation basin for separating solid and liquid. However, an electron acceptor for oxidizing the organic matters has to be necessarily supplied when the biological filtration is used in removing the dissolved organic matters. To supply the electron acceptor, a lot of energy (electricity) is consumed, and therefore an energy efficiency has to be also taken into account.

According to the present disclosure, the biological filtration is used to remove previously and efficiently the solids and the organic matters so that the subsequent short-cut nitrogen removal process can be improved in operating stability and processing efficiency, and the electron acceptor needed for removing the organic matter in the biological filtration process is economically supplied, so that the whole process can be improved in economy.

According to one embodiment of the present disclosure, a waste-water processing apparatus comprises: a biological filtration tank configured to perform biological filtration as a pretreatment process with regard to influent waste water and remove solids and organic matters; a nitritation tank configured to perform a nitritation process with regard to waste water flowing from the biological filtration tank and supply an electron acceptor needed for removing the organic matter in the biological filtration tank by returning some of the waste water back to the biological filtration tank; and an anammox tank configured to perform an anaerobic ammonium oxidizing process with regard to the waste water received from the biological filtration tank and the nitritation tank. In this case, the quantity of the waste water flowing from the biological filtration tank into the anammox tank is adjusted so that the amount of nitrite nitrogen is the same with the amount of ammoniac nitrogen in the anamox tank. The quantity of waste water flowing from the biological filtration tank to the nitritation tank may be adjusted within 0.6~4.0 times the influent quantity, the quantity of waste water returned from the nitritation tank to the biological filtration tank may be adjusted within 0.5~3.0 times the influent quantity, and the quantity of waste water flowing from the biological filtration tank into the anammox tank may be adjusted within 0.1~1.0 times the influent quantity.

According to an alternative embodiment of the present disclosure, the nitritation tank and the anammox tank may be integrated into a single reaction tank.

According to another alternative embodiment of the present disclosure, the biological filtration tank and the nitritation tank may be integrated as a single integrated reaction tank in which both removal of the organic matters and reaction of the nitritation are performed at a time.

The waste-water processing apparatus may further comprise an algae culturing tank configured to supply oxygen, which is produced by growing algae, as the electron acceptor needed for removing the organic matters in the biological filtration tank.

The algae culturing tank may receive waste water from the biological filtration tank and use nitrogen in the waste water as a raw material for culturing the algae.

The algae culturing tank may receive carbon dioxide produced at combustion for power generation using methane gas generated in an anaerobic digestion process.

The biological filtration tank may comprise a roots blower, and the roots blower may operate to inject air during the operation of the biological filtration tank and supply oxygen to the biological filtration tank.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

The present disclosure proposes a method of utilizing biological filtration as pretreatment to previously remove solids and organic matters, thereby securing stability and efficiency of a subsequent process. To this end, the present disclosure provides a process as shown in FIG. 3.

Figure 1:
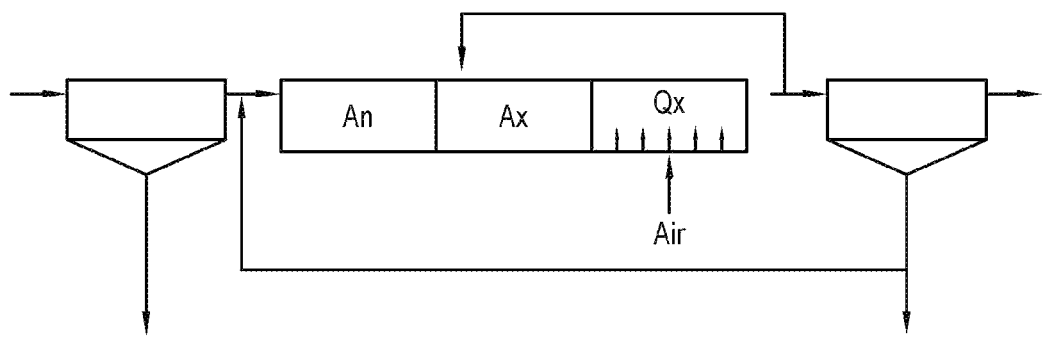
FIG. 1 schematically shows a conventional sewage and waste water treatment process.
Figure 2:
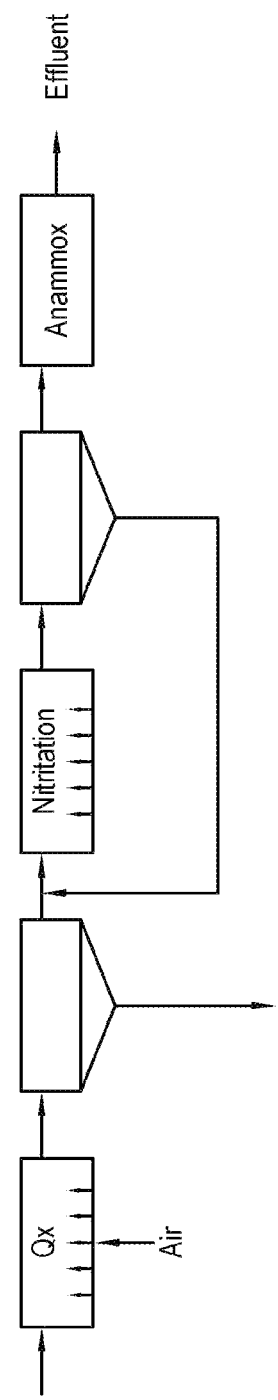
FIG. 2 shows a conventional organic matter removal process and a short-cut nitrogen removal process.
Figure 3:
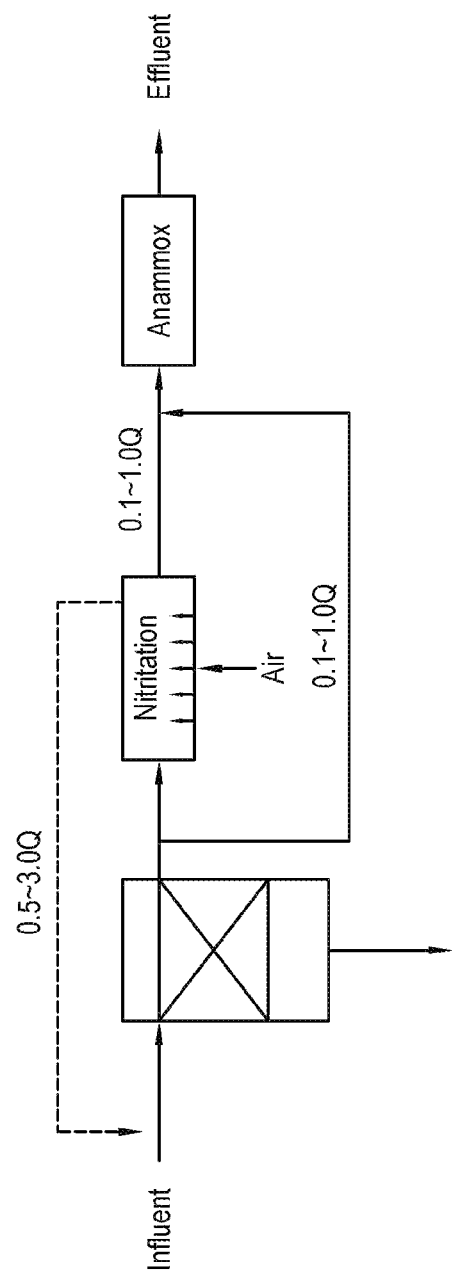
FIG. 3 shows a treatment process according to the present disclosure.

As shown in FIG. 3, a waste-water processing apparatus according to the present disclosure includes a biological filtration tank, a nitritation tank, and an anammox tank (i.e. a reaction tank in which an anaerobic ammonium oxidizing process is performed) in sequence from the left side of FIG. 3. The biological filtration tank serves as a pretreatment process device, and the nitritation tank and the anammox tank serve as a short-cut nitrogen treatment process device.

The biological filtration tank is placed at the anterior stage of the whole system, and filled with a filter medium to thereby filter out the solids in the sewage and waste water. The sewage and waste water, from which the organic matters and the solids are removed, flow in the nitritation tank of the subsequent short-cut nitrogen removal process so that ammoniac nitrogen can be converted into nitrite nitrogen.

The quantity of sewage and waste water flowing in the nitritation tank is adjusted within 0.6~4.0 times the influent quantity Q. 0.5~3.0 Q of this is returned to the biological filtration tank and used to oxidize the organic matters in the sewage and waste water. Thus, dissolved organic matters, which are not removed by filtration in the biological filtration tank, are oxidized by electron acceptors (oxygen, nitrate nitrogen, nitrite nitrogen) supplied from the nitritation tank. Therefore, the biological filtration tank does not need a separate device for supplying the electron acceptor, and the load of nitrogen in the subsequent anammox tank is also reduced to thereby decrease the size of whole reaction tank and lower construction costs.

The sewage and waste water flows from the biological filtration tank to the anammox tank within 0.1~1.0 times the influent quantity Q, and is subjected to a denitrification reaction so that nitrogen can be removed therefrom. In this case, the influent quantity is adjusted to have a ratio of between nitrite nitrogen and ammoniac nitrogen in the anammox tank.

By the way, the nitritation tank and the anammox tank are provided with filter media, so that microorganism can grow outside the filter medium. When the microorganism is attached to and grows in the filter medium, the apparatus's operating performance is prevented from being gradually deteriorated since the microorganism does not decrease even though the apparatus operates for a long term, and there are no needs of providing an additional solid and liquid separation device to the posterior stage of the waste-water processing apparatus.

By the way, according to the present disclosure, the return of the waste water from the nitritation tank to the biological filtration tank means as follows The nitritation tank has to keep the concentration of the electron acceptor (oxygen) low for normal performance, and therefore only oxygen in the nitritation tank is not enough to supply the electron acceptors for removing the organic matters flowing in the biological filtration tank. However, the present disclosure does not supply oxygen but returns nitrite nitrogen, and it is thus possible to sufficiently supply the electron acceptor. Oxygen supplied by $NO_2$ is about two third of that supplied by $NO_3$. Typically, the organic matter is biologically decomposable as much as a concentration of about 250 mg/L in the sewage, and it is thus difficult to fully remove the organic matters. According to the present disclosure, a biological filter bed filters out the solid organic matter, but employs the electron acceptor to remove the dissolved organic matter. However, the dissolved organic matter is only half the whole organic matter, and the return of the nitritation is enough to remove the dissolved organic matter.

On the other hand, the anammox tank has to keep a ratio of C/N low as a prerequisite, and performs condensation/precipitation like the exiting method as the pretreatment of the short-cut nitrogen removal process. However, a condensation/precipitation tank removes only the solid organic matter but not the dissolved organic matter. The nitritation tank or the anammox tank has to keep a ratio of C/N lower than or equal to 1~2, and keep the ratio lower than or equal to 1 for a stable result. When the concentration of the dissolved organic matter and nitrogen is taken into account, the existing condensation/precipitation tank cannot remove the organic matter to be suitable for the nitritation or anammox process. In contrast, according to the present disclosure, both the solids and the dissolved organic matters are removed in the biological filtration tank.

Further, according to the present disclosure, the quantity of the waste water flowing from the biological filtration tank into the anammox tank is adjusted so that the amount of nitrite nitrogen is the same with the amount of ammoniac nitrogen in the anamox tank. The concept of adjusting the ratio of $NO_2/NH_4$ in the anammox tank has already been known. However, the existing anammox technologies are focused on the anammox process itself rather than the removal of the organic matter in the previous stage. This is because the existing technologies are aimed at removing nitrogen produced in the anaerobic digestion tank, and most of organic matters are removed in the anaerobic digestion tank. The existing anammox technologies are materialized by "the anaerobic digestion tank+the anammox tank". Therefore, the present disclosure is different from the existing technologies in that the organic matters are removed without the existing anaerobic digestion tank and the anammox process is applied to not the recycled water but the main treatment process. In other words, the present disclosure first employs combination of "the biological filtration+the anammox" is first introduced in, and is different from the existing technologies in that both the solids and the dissolved organic matter are removed at a time by removing the solids through the return from the nitritation tank to the biological filtration tank and the filtration in the biological filtration tank and by removing only the dissolved organic matter through the returned nitrite nitrogen.

As one of conventional technologies, Japanese Patent Publication No. 2005-324131 (Nov. 24, 2005) discloses a wastewater treatment apparatus with an anoxic tank, a nitrous acid production tank, and an anaerobic ammonia tank. This conventional technology is regarded as a concept of employing an anoxic tank for the pretreatment of the short-cut nitrogen removal process, and is thus different from the present disclosure in whether the pretreatment corresponds to the biological filtration tank or the anoxic tank.

In this conventional technology, the anoxic tank only serves to remove the residual organic matter having a low concentration in raw water. That is, the process operates only when the quantity of organic matter in the raw water is less than that of ammoniac nitrogen ($NH_4$—N) in the raw water. Therefore, this conventional technology is applicable to not the raw water, i.e. general sewage desired to be treated according to the present disclosure, but only waste water including nitrogen of high concentration like recycled water of the anaerobic digestion tank.

As the first reason, if the return is performed in the posterior stage of the anammox tank, residual nitrite nitrogen ($NO_2$—N) after the anammox tank becomes almost zero, and only nitric nitrogen ($NO_3$—N) remains as byproducts. The residual quantity of nitric nitrogen ($NO_3$—N) is merely 10% of the removed quantity of nitrite nitrogen. In case of general sewage desired to be processed according to the present disclosure, only nitric nitrogen of about 2 mg/L is introduced into the anoxic tank. This nitric nitrogen can remove only the organic matter as much as 8 mg/L, and therefore cannot treat the sewage of the present disclosure since it includes 100 mg/L or more organic matter. To remove more organic matter, a method of increasing the returning quantity may be taken into account. In this case, a proper reaction does not happen since a stay time is shortened with increased influx of the nitritation tank and the anammox tank, and thus the process does not operate. For this reason, the return is performed at the nitritation tank placed at the anterior stage of the anammox tank in the present invention.

As the second reason, the anoxic tank is also regarded as that for removing the organic matter. However, in the conventional technology, the solids in the raw water and the microorganism generated in the anoxic tank flow into the nitritation tank or the anammox tank. In this case, the nitritation tank competes with nitritation microorganisms for air, and the anammox tank competes with anammox microorganisms for nitrous acid, thereby decreasing the reactions in the nitritation tank and the anammox tank. Therefore, when the conventional technology is applied to the process for the raw water, in which the concentration of the organic matter in the influx water is higher than that of ammoniac nitrogen, like the raw water desired to be processed according to the present disclosure, the nitrite-anammox reaction does not happen and it is thus impossible to operate the process. In contrast, according to the present disclosure, the microorganisms generated by denitrification reaction with the influent solids are removed by not the anoxic tank but the biological filtration tank, and do not flow in the nitrite and anammox reaction tanks.

Figure 4:
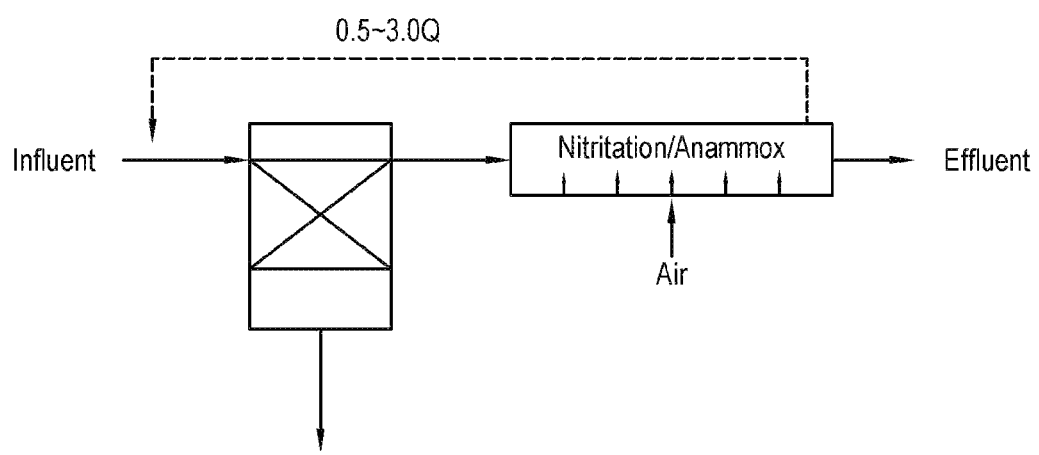
FIGS. 4 to 8 show various embodiments of the present disclosure.

FIG. 4 is an alternative example of the present disclosure, in which the nitritation tank and the anammox tank are integrated as a single reaction tank. In this embodiment, all the biological reactions are the same as those shown in FIG. 3, but the short-cut nitrogen removal processes are simultaneously performed in this integrated reaction tank. Even in this case, the electron acceptor for removing the organic matter in the biological filtration tank is supplied by the return from the integrated reaction tank.

Figure 5:
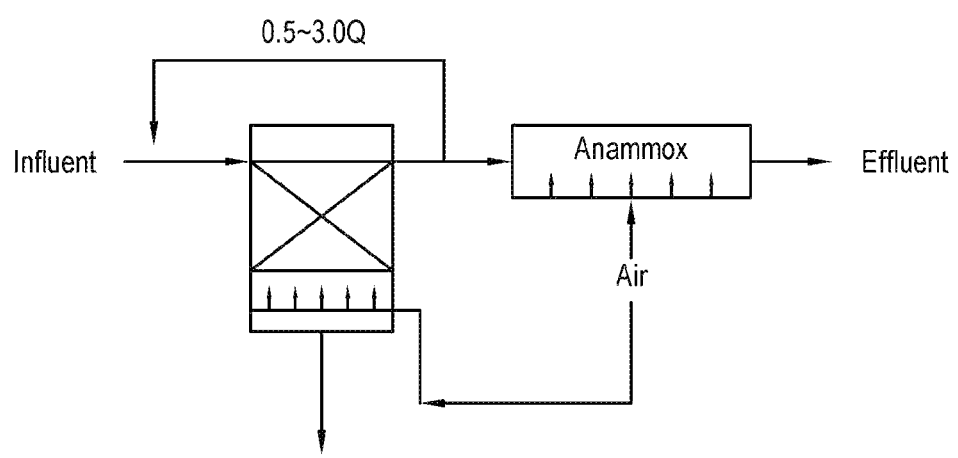

FIG. 5 shows an example in which the biological filtration tank and the nitritation tank of FIG. 3 are provided as a single integrated reaction tank so that both the removal of the organic matter and the nitritation reaction can be performed at a time in the biological filtration tank. With this configuration, the whole processes are simplified, and the load of nitrogen in the subsequent anammox tank, thereby reducing the stay time.

Figure 6:
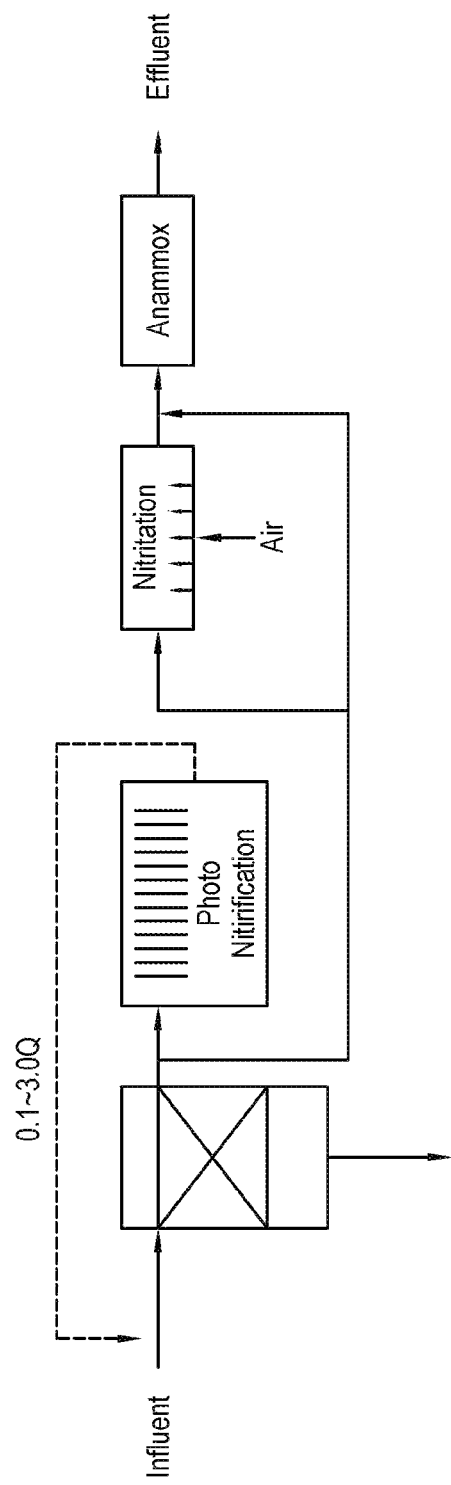

FIG. 6 shows an example in which the electron acceptor needed for removing the organic matter is supplied by growing algae to produce oxygen in the biological filtration tank of the present disclosure. To this end, an algal culture (photo-nitrification) tank is additionally arranged in the biological filtration tank of FIG. 3. The algal culture tank receives waste water from the biological filtration tank, and uses nitrogen of the waste water as a raw material for culturing the algae. The algae generates oxygen of 15.1~19.7 mg with nitrogen of 1 mg through photosynthesis using sunlight by the following formula.

$$16NH_4^+ + 92CO_2 + 92H_2O + 14HCO_3^- + HPO_4^{2-} \rightarrow C_{106}F_{263}O_{110}N_{16}P + 106O_2$$

$$16NO_3^- + 124CO_2 + 140H_2O + HPO_4^{2-} \rightarrow C_{106}H_{263}O_{110}N_{16}P + 138O_2 + 18HCO_3^-$$

Produced oxygen is supplied to the biological filtration tank and used in removing the organic matter. Therefore, the organic matter is efficiently removed without separately supplying energy, thereby innovatively reducing energy consumption. Further, carbon dioxide of 1.3 mg is absorbed when algae of 1 mg is synthesized, thereby reducing the emission of carbon dioxide causing global warming.

Figure 7:
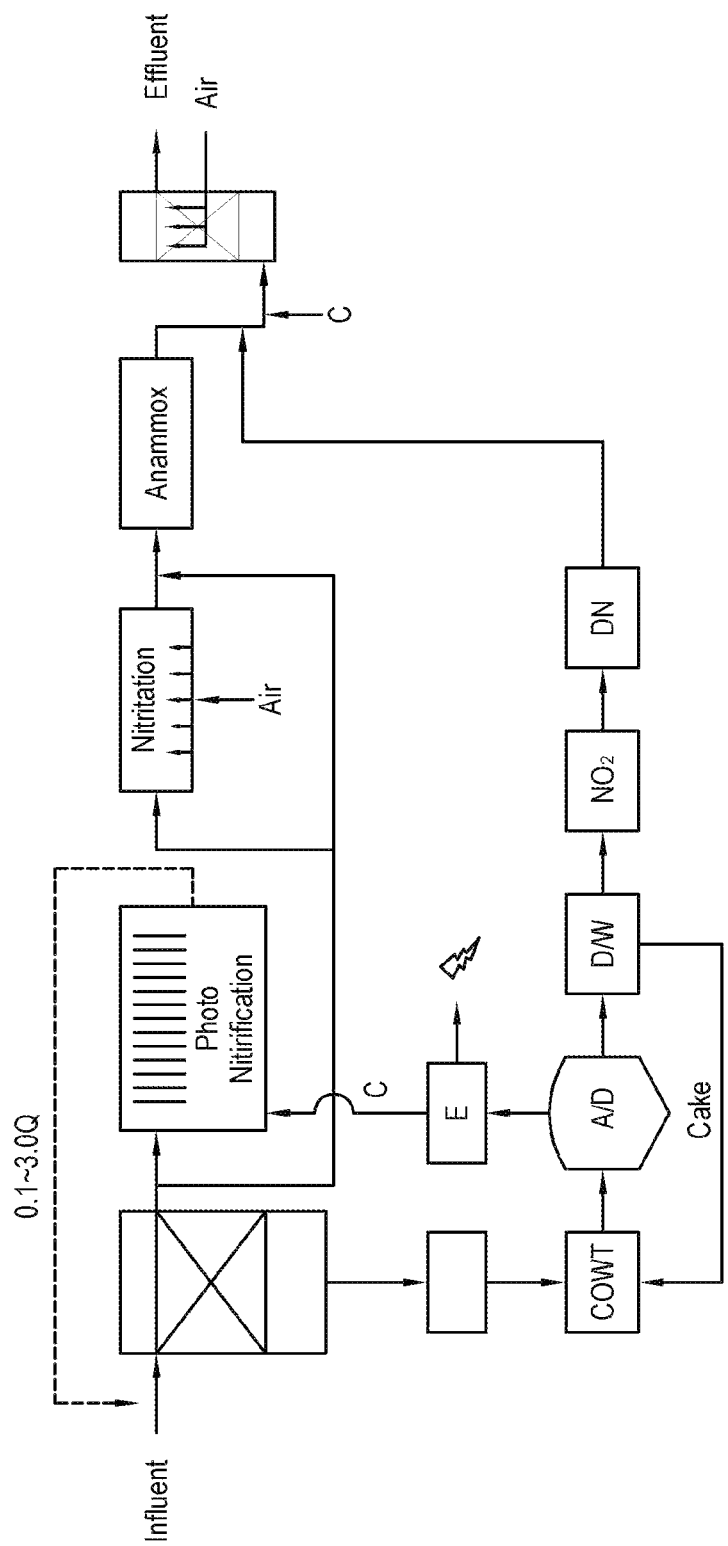

FIG. 7 shows an embodiment where an element for supplying carbon dioxide is added to the algae culturing tank of FIG. 6. That is, when the amount of oxygen produced in the algae culturing tank is insufficient to supply oxygen needed for oxidizing the organic matter in the biological filtration tank, carbon dioxide produced at combustion for power generation using methane gas generated in an anaerobic digestion process is introduced into the algae culturing tank, thereby increasing the production of oxygen and additionally reducing the emission of carbon dioxide.

Figure 8:
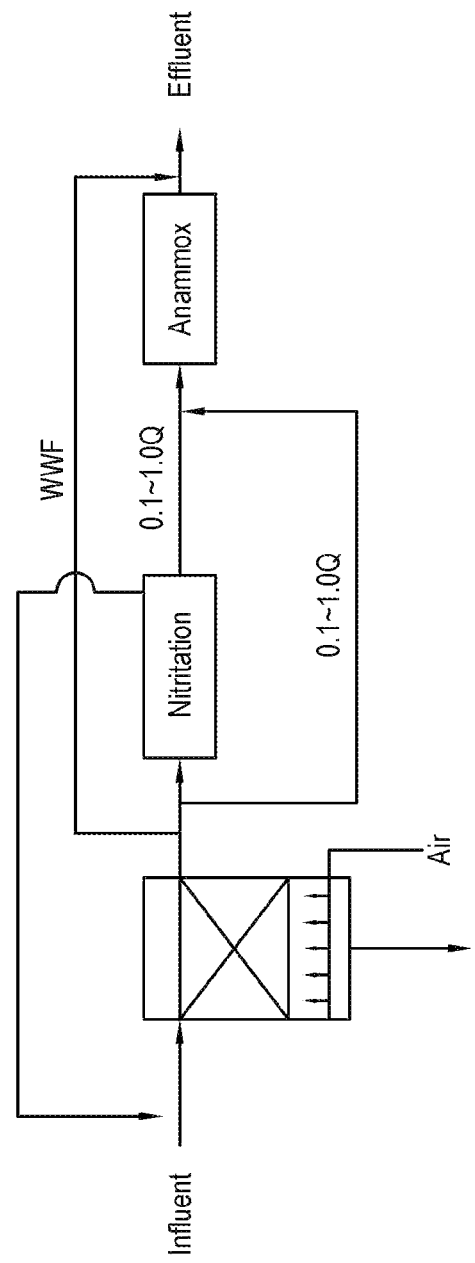

FIG. 8 shows a configuration of stabilizing the operation of the subsequent nitrogen removal process and minimizing the total amount of organic matter discharged into a water system by treating an initial rainfall effluent flowing into the sewage treatment plant through the process according to the present disclosure. In this case, a roots blower may be used when the amount of oxygen needed for oxidizing the organic matter is insufficient, and thus there are no needs of installing a separate blower. This reduces initial construction costs. That is, the roots blower is installed in the biological filtration tank, and supplies backwashing air to remove foreign materials attached to the filter medium during a halt in which the whole operations of the waste-water processing apparatus are stopped. According to the present disclosure, the roots blower in the biological filtration tank operates while the waste-water processing apparatus operates, and thus injects backwashing air to thereby supplement shortage of oxygen.

As described above, according to the present disclosure, biological filtration is employed as pretreatment of a short-cut nitrogen removal process. Therefore, solids and organic matters are efficiently removed through the biological filtration, and thus the efficiency in operation of the subsequent process and the stability of the treatment are improved, thereby ultimately securing stale treatment quality of water. Further, an electron acceptor needed for removing the organic matters is supplied through the process and apparatus that consume low energy, thereby reducing the energy of the whole processes by up to 75%.

What is claimed is:

1. A waste-water processing apparatus comprising:
   a biological filtration tank configured to perform biological oxidation and matter filtration as a pretreatment process with regard to influent waste water and remove solids and organic matter;
   a nitritation tank configured to perform a nitritation process with regard to waste water flowing from the biological filtration tank and supply an electron acceptor needed for removing the organic matter in the biological filtration tank, the nitritation tank being further operatively connected to return a portion of the waste water back to the biological filtration tank so as to supply the electron accepter via nitrated nitrogen generated in the nitration tank; and
   an anammox tank configured to perform an anaerobic ammonium oxidizing process with regard to the waste water received from the biological filtration tank and the nitritation tank,
   wherein the nitritation tank and the anammox tank each include filter medium formed therein to promote microorganism growth thereon, and
   wherein a quantity of the waste water flowing from the biological filtration tank into the anammox tank is adjusted so that an amount of nitrite nitrogen is the same with an amount of ammoniac nitrogen in the anammox tank.

2. The waste-water processing apparatus according to claim 1, wherein the quantity of waste water flowing from the biological filtration tank to the nitritation tank is 0.6~4.0 times the influent quantity.

3. The waste-water processing apparatus according to claim 2, wherein the quantity of waste water returned from the nitritation tank to the biological filtration tank is 0.5~3.0 times the influent quantity.

4. The waste-water processing apparatus according to claim 1, wherein the quantity of waste water flowing from the biological filtration tank into the anammox tank is 0.1~1.0 times the influent quantity.

5. The waste-water processing apparatus according to claim 1, wherein the nitritation tank and the anammox tank are integrated into a single reaction tank.

6. The waste-water processing apparatus according to claim 1, wherein the biological filtration tank and the nitritation tank are integrated as a single integrated reaction tank in which both removal of the organic matters and reaction of the nitritation are performed at the same time.

7. The waste-water processing apparatus according to claim 1, further comprising an algae culturing tank configured to supply oxygen, which is produced by growing algae, as the electron acceptor needed for removing the organic matters in the biological filtration tank.

8. The waste-water processing apparatus according to claim 7, wherein the algae culturing tank receives waste water from the biological filtration tank and uses nitrogen in the waste water as a raw material for culturing the algae.

9. The waste-water processing apparatus according to claim 7, wherein the algae culturing tank receives carbon dioxide produced at combustion for power generation using methane gas generated in an anaerobic digestion process.

10. The waste-water processing apparatus according to claim 1, wherein:
    the biological filtration tank comprises a roots blower, and
    the roots blower operates to inject air during the operation of the biological filtration tank and supplies oxygen to the biological filtration tank.

* * * * *